Feb. 23, 1971  S. A. DOLD  3,564,666
DEVICE FOR THE TEMPORARY FASTENING OF PARTS
ON A SUBSTRUCTURE BY MEANS OF SCREWS
Filed Oct. 24, 1968  2 Sheets-Sheet 1

INVENTOR
SIEGFRIED AUGUST DOLD
BY
Mason, Porter, Wilen & Brown
ATTORNEYS

3,564,666
DEVICE FOR THE TEMPORARY FASTENING OF PARTS ON A SUBSTRUCTURE BY MEANS OF SCREWS
Siegfried August Dold, 10 Breslauer Strasse,
4134 Rheinberg, Germany
Filed Oct. 24, 1968, Ser. No. 770,247
Claims priority, application Germany, Oct. 25, 1967,
P 16 25 478.7
U.S. Cl. 24—73                                                       12 Claims

ABSTRACT OF THE DISCLOSURE

This disclosure relates to a device for the fastening of parts on a substructure by means of screws. The device may be provided with one or more screw receivable slots having parallel walls with each slot being of a width corresponding to the diameter of the thread of the intended screw. The slot walls carry thread-like profiles to fit the intended screw. The opposing profiles may either slope in the same direction to facilitate the feeding of a screw into the slot from one end toward the center thereof or the profiles may slope in the opposite directions to facilitate the insertion of a screw through a normal screwing actions.

---

The present invention relates to a device for the fastening—particularly the temporary fastening—of parts on a sub-structure by means of screws. Known devices of this category consist, for example, of a steel plate with parallel slots arranged therein, having a width which permits the inserting of a certain size of screws. In order to fasten the part, e.g. the work, on the plate the part is placed on the latter in the desired position and is then held by screws which are inserted through the slots from below and are tightened with nuts. In such an arrangement the heads of the screws make either direct or indirect contact with the part. For example, such fastening devices are used for the attaching of work to carpenter's benches or for the clamping of electric motors on supporting brackets, i.e. they are particularly used in cases where an aligned position of the respective part is of importance.

On the known devices it is a disadvantage that the attaching of nuts to the screws the plates must be accessible from below. Furthermore, two hands are needed in these cases and mostly also two spanners in order to connect the screws with the nuts. Therefore, it is an object of this invention to create a device of the above mentioned category on which the usual nuts are no longer needed.

According to the invention the problem is solved through a device for the temporary fastening of parts on a sub-structure by means of screws, the device being characterized in that it carries slots with parallel walls— or also one slot only—the width equalling that of the diameter of a screw thread, and the slot walls carrying over their entire length a thread-like profile to fit the screws, with the opposite thread profiles having the same pitch angle, but being in a staggered arrangement. According to embodiments of this invention the pitch of the opposite profiles may lead either in the same direction or in opposite directions.

Through the teaching disclosed in the invention not only the set task is completely solved, but there are also a number of further advantages. In the case of the pitch of the opposite profiles leading in the same direction the device in accordance with this invention would permit simply to introduce the respective screw into the profiles of the threads on the slot walls until the end of the screw contacts the bottom of the slot. A comparatively slight tightening of the screw would then result in a sufficient fastening in many cases. Therefore, this design of the device would be particularly suitable for the use of butterfly screws which are manually tightened. Generally, the fitting of screws may be done considerably faster than with the normal screwing into an internal thread.

In the case of an inclination of the opposite profiles in opposite directions it is an advantage that the screws may be inserted into the slots at random locations without any lateral shifting. This design is specially provided for cases where not merely a rapid and temporary fastening is involved of the respective part, but where either a safe and durable fastening is desired or a fastening where it is a major requirement that it will also withstand higher forces which, at least with components, act in the direction of the slots.

One embodiment of the invention is characterized by a multitude of slots in a parallel arrangement. This way, there is an almost unlimited number of possible positions on the part to be fastened. In accordance with another embodiment the slots may also be arranged crosswise. Such an arrangement would even increase the range of fastening varieties.

According to the invention a preferred embodiment which permits a simple manufacture of the device is that the slots are formed by fillets which are fastened to a base plate in a parallel arrangement and which on their facing surfaces carry the thread profiles. The fillets with their profiled flanks may be produced on automatic machine tools without difficulty. In the case of the slots being arranged crosswise, block type components will be used instead of the fillets, these blocks having thread profiles on four sides. Principally, this proposal in accordance with the invention has the object of being in a position to assemble the device from component parts, thereby offering the possibility to compose devices of any size by using standard parts.

Also, and according to another embodiment of the invention, the fillets may be arranged on non-profiled pedestals which opens the possibility also to use longer screws although in individual cases a shorter screw would be sufficient.

Furthermore, the invention contains the proposal that the inclination of the longitudinal ribs of the thread-like profiles on the slot walls be steeper than would be necessary for the vertical inserting of a screw. This teaching would disclose a particularly fast attachability of the screws as it would merely be necessary to insert them along the thread profile in a downward direction. In particular, this form of embodiment would be useful for rapid clamping attachments.

In order to avoid that the slot walls are forced apart it would be of advantage in accordance with the invention if the thread profiles were designed in the usual way as trapezoidal thread profiles.

With the feature that the fillets to form the slot walls are arranged on non-profiled pedestals, this invention in respect of the fastening of work to plates opens another field of application, i.e. the field of the fastening of furniture and appliances in homes or offices, storage sheds etc. In this connection the term furniture and appliances would also comprise, for example, lighting fixtures and other objects which render the working or living in such rooms possible from the more technical point of view and which are necessary for same. Frequently, the fastening of such items at varying locations creates difficulties as plugs must be set which, when not in use, have a detrimental effect on appearance. In these cases the invention would be a remedy, i.e. with the teaching that the fillets with their pedestals should preferably have the shape of long mounting rails for the fastening, for example, of lighting fixtures under the ceiling of a room or of shelf boards along the wall of a room. For this purpose, the mounting rails should have a basically rectangular cross section, in which case the flat side is used for the fixing of the rail to the respective backing structure, with suitable means being provided for this purpose, e.g. screw holes, and where the opposite flat side has a longitudinal slot along its center, forming the said slot, the opposite walls of its being provided with thread profiles.

The drawing illustrates examples for embodiments of this invention where

FIG. 4 is a perspective view of still another form of the invention embodied in a mounting rail.

Figure 1:
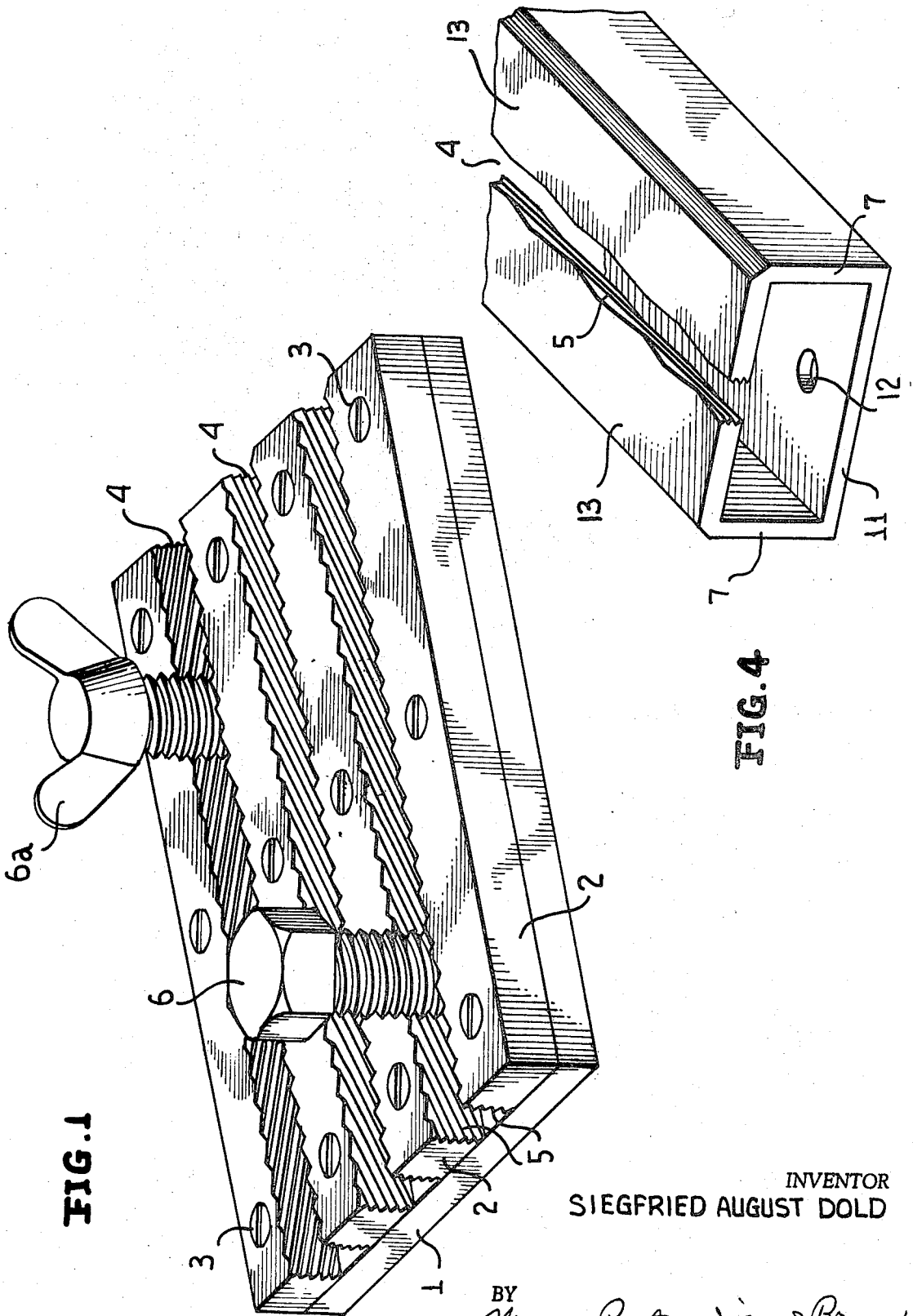
FIG. 1 is a perspective view of a fastening plate embodying the invention.

The device shown in FIG. 1 consists of a base plate 1 and of strips or fillets 2 which are fastened to the plate 1 by means of countersunk head screws 3. The fillets 2 form slots 4 between each other, and on the surfaces which form the side walls of the slots they carry a longitudinally extending thread-like profiling 5. The width of the slots corresponds to a standard screw size and, preferably, it depends on the intended application of the device. Hexagon head screws 6 may be screwed into the slots 4 at random locations. Alternatively, butterfly screws 6a may be used. Depending on the direction of the pitch of the opposite thread profiles it is possible either vertically to screw the screws 6 or 6a at the locations where they shall be seated or to push them in laterally until they reach such location which is done even faster. As soon as the screw makes contact, either with the underside of its head against the top face of the fillet, or with the end of its shaft against the bottom of the slot, its thread will become seized by the profiles 5, and the screw may be tightened.

Figure 2:
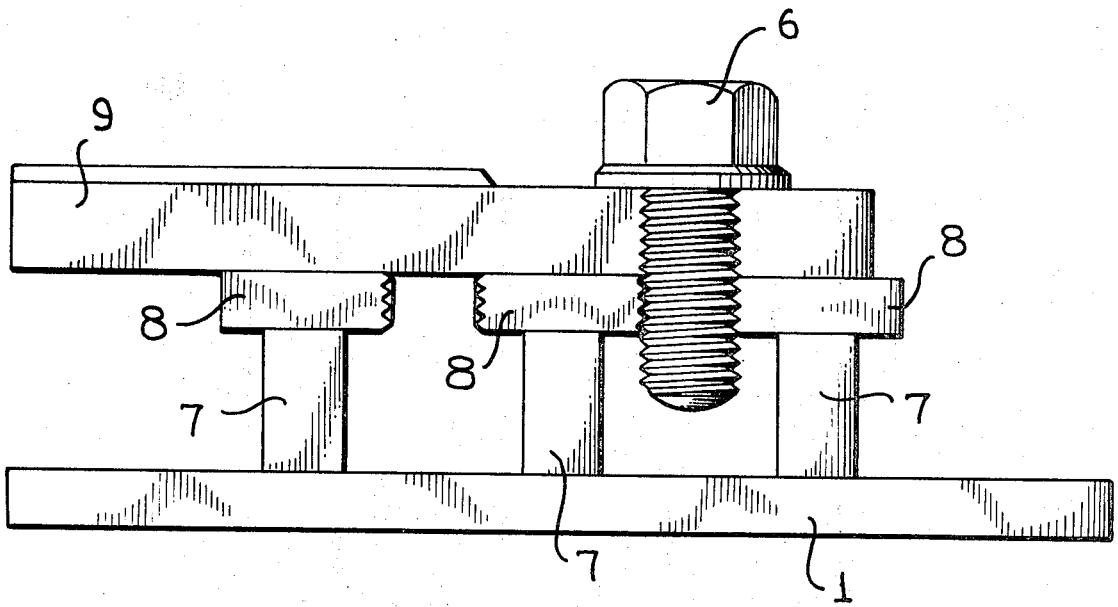
FIG. 2 is a front view of another embodiment of the invention including a fastening plate.

In FIG. 2 parallel pedestals 7 with top mounted thread strips or fillets 8 are arranged on a base plate 1. The pedestals 7 are narrower than the fillets 8. A tool 9 has been placed on the device and is being held by means of a screw 6. The screw may extend through an opening in the work 9, or it may laterally contact the work with its shaft and hold down the work by gripping it with the underside of its head.

Figure 3:
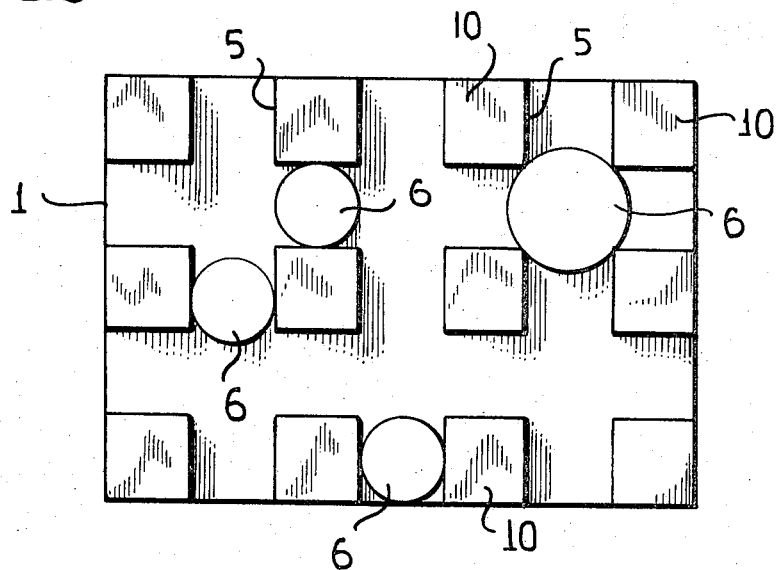
FIG. 3 is a plan view of a third embodiment of the invention involving the use of another form of fastening plate.

FIG. 3 is a plan view of a fastening plate with the slots in crosswise arrangement. For this purpose block shaped components 10 which have threaded profiles 5 on all sides except top and bottom are screwed onto base plate 1, i.e. in such an arrangement that slots are formed between the parts 10, the width of which corresponds to the diameter of the thread of the screws 6. In this arrangement the lateral length of the parts 10 must either correspond to the screw diameter or a multiple thereof, such that screws may be inserted at any point of the slots.

Finally, FIG. 4 shows a mounting rail for the fastening of lamps, cables, sanitary installations or objects of of another nature, the rail either being a one-piece plastic extrusion or a light alloy section, with a base 11 with screw holes 12, opposite which a slot 4 with lateral thread flanks 5 is arranged, the slot being formed by inwardly protruding fillet sections 13. The wall sections which support the fillet sections 13 correspond to the pedestals 7 shown in FIG. 2. This mounting rail is fastened at the wall or ceiling with its base 11, whereupon lamp suspensions or cable terminals may be attached to the parts 13 by means of screws which are inserted into the slot 4.

The features of the object of the invention as disclosed in the above mentioned specification, in the drawing and in the under-mentioned claims may be significant for the realization of the invention in its various embodiments, both individually and in random combinations with each other.

What is claimed is:

1. A supporting device of the character described including supporting means presenting opposing wall portions spaced to define between them a longitudinal slotway wherein to receive in any selected position a fastener having an externally threaded shank portion engageable only at opposite sides thereof with said wall portions, at least one said wall portion having thread-like profiling engageable by the threads of said fastener shank portion, the slotway defining wall portions having thread-like profiling corresponding to the pitch of the shank portion threads and cooperatively opposing so that the fastener can be moved into a thread-like interlocking mounting relation by movement thereof in a direction generally normal to the axis of said shank portion rather than along said axis.

2. A device for the fastening of parts on a substructure by means of screws, said device being formed with at least one screw receivable slot having parallel walls, said slot having a width corresponding to the diameter of the thread of the intended screws, and the slot walls carrying thread-like profiles to fit the intended screw, which profiles extend over the entire length of said slot with the pitch of the opposed thread profiles having the same inclination in the same direction.

3. A device according to claim 2, characterized in that the inclination of the longitudinal ribs of the thread-like profiles on the walls of the slot is steeper than would be necessary for the vertical screwing-in of a screw.

4. A device for the temporary fastening of parts on a substructure by means of screws, characterized in that the device is fitted with a plurality of slots each having parallel walls, said slots being disposed in acrosswise arrangement, the slot width corresponding to the diameter of the thread of a screw, and the slot walls carrying thread-like profiles to fit the screws which profiles extend over the entire length of the slots, with the pitch of the opposite thread profiles having the same inclination but rising in opposite directions.

5. A device for the fastening of parts on a base plate, a plurality of fillets arranged on said base plate in parallel spaced relation and defining at least one screw receiveable slot therebetween each having parallel walls, said slot having a width corresponding to the diameter of the thread of the intended screw, and the slot walls carrying thread-like profiles to fit the intended screw, which profiles extend over the entire length of said slot with the pitch of the opposed thread profiles having the same inclination and each fillet being spaced from said base plate by pedestal of lesser width to provide clearance for screws which are threaded into said slots.

6. A device according to claim 5 characterized in that the device is of a one piece construction and has a channel shaped cross section with said pedestals being upstanding flanges and said fillets being opposed flanges having parallel opposed edge faces.

7. A device for the fastening of parts on a substructure by means of screws, said device being formed with at least one screw receivable slot having parallel walls, said slot having a width corresponding to the diameter of the thread of the intended screw, and the slot walls carrying thread-like profiles to fit the intended screw, which profiles extend over the entire length of said slot with the pitch of the opposed thread profiles having the same inclination, said device being in the form of a channel cross sectional elongated mounting rail having a substantially rectangular cross section, one side of said mounting rail having said slot extending longitudinally along its center, and the side of said rail opposite said one side being intended for the mounting of said rail and having fastening means formed therein.

8. A device particularly adapted for the temporary fastening of parts on a base by means of screws, said device comprising said base and a plurality of rigid shape sustaining elements carried by said base and defining therebetween at least one longitudinally extending groove having transversely spaced parallel walls, facing each other, each of said walls having formed therein a thread profile corresponding to the intended screw and extending over the entire length of said wall, said thread profiles of each groove facing each other and having the same pitch angle while being displaced in relation to one another, and said facing thread profiles rising in opposite directions.

9. A device according to claim 2 characterized in that said rigid elements are in the form of separate bars mounted on said base plate in parallel one beside the other relation.

10. A device according to claim 9 characterized in that said bars are directly seated on said base and are secured in place thereon by fasteners.

11. A device according to claim 8 wherein said bars are spaced from said base.

12. A device according to claim 8 wherein said device is of a hollow rectangular configuration having a longitudinal slit in the form of said groove, and said base has mounting openings aligned with said slit for facilitating the mounting of said device.

References Cited
UNITED STATES PATENTS

| | | | |
|---|---|---|---|
| Re. 24,133 | 3/1956 | Bloedow | 85—321INTX |
| 1,223,595 | 4/1917 | McMillan | 85—321INTUX |
| 3,139,960 | 7/1964 | Hammitt et al. | 85—321INTX |
| 3,159,250 | 12/1964 | Wilson | 85—321INTUX |

DONALD A. GRIFFIN, Primary Examiner

U.S. Cl. X.R.

85—32